(12) United States Patent
Clemmer (10) Patent No.: US 9,616,716 B2
(45) Date of Patent: Apr. 11, 2017

(54) THREE DIMENSIONAL SIPE (75) Inventor: Kathleen Clemmer, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 1012 days.

(21) Appl. No.: 13/325,833

(22) Filed: Dec. 14, 2011

(65) Prior Publication Data

US 2013/0153106 A1    Jun. 20, 2013

(51) Int. Cl.
B60C 11/12 (2006.01)

(52) U.S. Cl.
CPC ...... B60C 11/1281 (2013.04); B60C 11/1218 (2013.04); *B60C 2011/1213* (2013.04)

(58) Field of Classification Search
CPC ......... B60C 11/1218; B60C 2011/1213; B60C 11/1281; B60C 11/1222
USPC .......................... 152/209.21, 209.23, DIG. 3
See application file for complete search history.

(56) References Cited

U.S. PATENT DOCUMENTS

| | | |
|---|---|---|
| 4,986,325 A | 1/1991 | Matsumoto |
| 5,095,963 A | 3/1992 | Maitre |
| 5,247,151 A | 9/1993 | Hagerman |
| 5,287,905 A | 2/1994 | Caretta et al. |
| 5,289,862 A | 3/1994 | Schuster |
| 5,327,953 A | 7/1994 | Ichiki |
| 5,360,043 A | 11/1994 | Croyle et al. |
| 5,361,815 A | 11/1994 | Loser et al. |
| 5,361,816 A | 11/1994 | Hitzky |
| 5,385,189 A | 1/1995 | Aoki et al. |
| 5,407,005 A | 4/1995 | Consolacion et al. |
| 5,529,101 A | 6/1996 | Croyle et al. |
| 5,538,060 A | 7/1996 | van der Meer et al. |
| 5,547,361 A | 8/1996 | Baker |
| 5,580,404 A | 12/1996 | Hitzky |
| 5,647,926 A | 7/1997 | van der Meer et al. |
| 5,753,058 A | 5/1998 | Fukumoto |
| 5,783,002 A | 7/1998 | Lagnier |
| 5,798,127 A | 8/1998 | Thayer et al. |

(Continued)

FOREIGN PATENT DOCUMENTS

| | | |
|---|---|---|
| DE | 202008018041 U1 | 6/2011 |
| EP | 0881103 A1 | 12/1998 |

(Continued)

OTHER PUBLICATIONS

Machine translation for Japan 2004-161166 (no date).*

(Continued)

*Primary Examiner* — Steven D Maki (57) ABSTRACT

Provided is a sipe extending into a tire tread, comprising an outer radial portion defined by a first waveform having a first amplitude, a first width, and a first wavelength, and an inner radial portion defined by a second waveform having a second amplitude, a second width, and a second wavelength. The first wavelength may be less than 5% of the length of the sipe or may be more than 100% of the length of the sipe, or the second wavelength may be less than 5% of the length of the sipe or may be more than 100% of the length of the sipe, or the second amplitude may be more than 50% of the first wavelength or may be less than 10% of the first wavelength, or the second amplitude may be more than 50% of the second wavelength or may be less than 10% of the second wavelength.

1 Claim, 9 Drawing Sheets

(56) References Cited

U.S. PATENT DOCUMENTS

| | | | |
|---|---|---|---|
| 5,824,169 A | 10/1998 | Landers et al. | |
| 5,833,779 A | 11/1998 | van der Meer et al. | |
| 5,833,781 A | 11/1998 | Fukumoto et al. | |
| 5,950,700 A | 9/1999 | Fukuoka | |
| 5,975,173 A | 11/1999 | Izumoto et al. | |
| 6,003,575 A | 12/1999 | Koyama et al. | |
| 6,026,875 A | 2/2000 | Diensthuber et al. | |
| 6,095,215 A | 8/2000 | Hutson et al. | |
| 6,102,093 A * | 8/2000 | Nakagawa | 152/DIG. 3 |
| 6,116,310 A | 9/2000 | Shinohara | |
| 6,189,586 B1 | 2/2001 | Guidry | |
| 6,202,725 B1 | 3/2001 | Moriya | |
| 6,315,018 B1 | 11/2001 | Watanabe | |
| 6,378,583 B1 | 4/2002 | Fontaine | |
| 6,408,911 B1 | 6/2002 | Tanabe et al. | |
| 6,427,737 B1 | 8/2002 | Katayama | |
| 6,435,237 B1 | 8/2002 | Elkurd et al. | |
| 6,439,285 B1 | 8/2002 | Elkurd et al. | |
| 6,446,689 B1 | 9/2002 | Elkurd et al. | |
| 6,484,772 B1 | 11/2002 | De Labareyre et al. | |
| 6,551,086 B1 | 4/2003 | Tuttle et al. | |
| 6,668,885 B2 | 12/2003 | Ishiyama | |
| 6,668,886 B1 | 12/2003 | Iwamura | |
| 6,786,257 B1 | 9/2004 | Koide | |
| 6,792,828 B2 | 9/2004 | Ishihara | |
| 6,817,848 B2 | 11/2004 | Ishihara | |
| 6,827,566 B1 | 12/2004 | Root et al. | |
| 6,907,910 B2 | 6/2005 | Iwamura | |
| 6,951,235 B2 | 10/2005 | Kawashima et al. | |
| 7,017,634 B2 | 3/2006 | Radulescu et al. | |
| 7,077,180 B2 | 7/2006 | Kuze | |
| 7,090,735 B2 | 8/2006 | Neugebauer et al. | |
| 7,093,631 B2 | 8/2006 | Colombo et al. | |
| 7,143,799 B2 | 12/2006 | Collette et al. | |
| 7,172,001 B2 | 2/2007 | Tanaka | |
| 7,188,650 B2 | 3/2007 | Nguyen et al. | |
| 7,246,644 B2 | 7/2007 | Colombo et al. | |
| 7,249,620 B2 | 7/2007 | Croissant et al. | |
| 7,270,162 B2 | 9/2007 | Kuroda | |
| 7,270,163 B2 | 9/2007 | Colombo et al. | |
| 7,341,082 B2 | 3/2008 | de Barsy | |
| 7,416,004 B2 | 8/2008 | Koya | |
| 7,467,652 B2 | 12/2008 | Knispel et al. | |
| 7,468,153 B2 | 12/2008 | Weydert et al. | |
| 7,481,257 B2 | 1/2009 | Matsumura | |
| 7,490,645 B2 | 2/2009 | Shinmura et al. | |
| 7,507,077 B1 | 3/2009 | Haag et al. | |
| 7,507,078 B2 | 3/2009 | Nguyen et al. | |
| 7,516,767 B2 | 4/2009 | Tsubono et al. | |
| 7,524,175 B2 | 4/2009 | Henrotte et al. | |
| 7,546,861 B2 | 6/2009 | Nguyen et al. | |
| 7,581,575 B2 | 9/2009 | Corvasce et al. | |
| 7,637,295 B2 | 12/2009 | Hashimoto et al. | |
| 7,661,942 B2 | 2/2010 | Nguyen et al. | |
| 7,670,123 B2 | 3/2010 | Cuny et al. | |
| 7,726,368 B2 | 6/2010 | Sakai | |
| 7,821,556 B2 | 10/2010 | Masuyama | |
| 2003/0029537 A1* | 2/2003 | Iwamura | 152/209.18 |
| 2006/0027296 A1 | 2/2006 | Tsubono et al. | |
| 2006/0118221 A1 | 6/2006 | Tsubono et al. | |
| 2006/0207702 A1 | 9/2006 | Miyazaki | |
| 2007/0006954 A1 | 1/2007 | Tsubono | |
| 2007/0084534 A1 | 4/2007 | Byrne | |
| 2007/0095447 A1 | 5/2007 | Nguyen et al. | |
| 2007/0144641 A1 | 6/2007 | Nguyen et al. | |
| 2007/0151646 A1 | 7/2007 | Ito | |
| 2007/0199634 A1 | 8/2007 | Sakamaki | |
| 2007/0295434 A1 | 12/2007 | Nguyen et al. | |
| 2007/0295435 A1 | 12/2007 | Nguyen et al. | |
| 2008/0041508 A1 | 2/2008 | Cambon et al. | |
| 2008/0099115 A1 | 5/2008 | Ohara | |
| 2008/0135149 A1 | 6/2008 | Sakamaki | |
| 2008/0149236 A1 | 6/2008 | Van Nguyen | |
| 2008/0149237 A1 | 6/2008 | Cambron et al. | |
| 2008/0185085 A1 | 8/2008 | Ohashi | |
| 2008/0196808 A1 | 8/2008 | Ikeda et al. | |
| 2008/0202658 A1 | 8/2008 | Ikeda et al. | |
| 2008/0230161 A1 | 9/2008 | Ishiyama | |
| 2008/0302457 A1 | 12/2008 | Byrne | |
| 2008/0308205 A1 | 12/2008 | Byrne | |
| 2009/0090444 A1 | 4/2009 | Feider et al. | |
| 2009/0095387 A1 | 4/2009 | De Barsy | |
| 2009/0151833 A1 | 6/2009 | Sakai | |
| 2009/0165911 A1 | 7/2009 | Ohashi | |
| 2009/0178744 A1 | 7/2009 | Nagai | |
| 2009/0218020 A1 | 9/2009 | Sumi | |
| 2009/0223613 A1 | 9/2009 | Saeki | |
| 2009/0255616 A1 | 10/2009 | Tomatsu | |
| 2009/0283189 A1* | 11/2009 | Mun | 152/209.18 |
| 2010/0132864 A1 | 6/2010 | Colombo et al. | |

FOREIGN PATENT DOCUMENTS

| | | | |
|---|---|---|---|
| EP | 933235 A2 * | 8/1999 | |
| EP | 1859962 A1 | 11/2007 | |
| EP | 2058145 A1 | 5/2009 | |
| EP | 2119575 A1 | 11/2009 | |
| JP | S59199306 | 11/1984 | |
| JP | 02-246810 A | 10/1990 | |
| JP | 04-372406 A * | 12/1992 | |
| JP | H04372406 | 12/1992 | |
| JP | 06-171311 A * | 6/1994 | |
| JP | 09-094829 A | 4/1997 | |
| JP | H09277805 | 10/1997 | |
| JP | 10-024709 A * | 1/1998 | |
| JP | H10024709 A | 1/1998 | |
| JP | H10315715 | 12/1998 | |
| JP | H1148721 | 2/1999 | |
| JP | 11-310013 A * | 11/1999 | |
| JP | 2973024 B2 * | 11/1999 | |
| JP | 2002-046426 A * | 2/2002 | |
| JP | 2003-011618 A | 1/2003 | |
| JP | 2003-118322 A * | 4/2003 | |
| JP | 2003-182314 A * | 7/2003 | |
| JP | 2004-161166 A * | 6/2004 | |
| JP | 2004210043 | 7/2004 | |
| JP | 2005104194 | 4/2005 | |
| JP | 2006035933 | 2/2006 | |
| JP | 2006056502 | 3/2006 | |
| JP | 2006069440 | 3/2006 | |
| JP | 2007-126139 A | 5/2007 | |
| JP | 2011-225020 A | 11/2011 | |

OTHER PUBLICATIONS

Machine translation for Japan 2003-182314 (no date).*
Machine translation for Japan 2002-046426 (no date).*
Machine translation for Japan 11-310013 (no date).*
Machine translation for Japan 06-171311 (no date).*
Machine translation for Japan 10-024709 (no date).*
Machine translation for Japan 2,973,024 B2 (no date).*
Partial translation for Japan 2,973,024 (no date).*
Machine translation for Japan 2003-118322 (no date).*
Coopertires, GFE, Copyright © 2011 Cooper Tire & Rubber Company, http://us.coopertire.com/Tires/Passenger/GFE.aspx, last visited Nov. 15, 2011.
Kuhmo Tires, Ecsta LX Platinum, © Copyright 2011 Kuhmo Tire USA, Inc., http://www.kumhotireusa.com/tire/category/car/6E4E0466-B6B3-42A3-A047-58F1418BE802, last visited Nov. 15, 2011.
Han, Joong Sub; International Search Report and Written Opinion; May 27, 2013; pp. 1-9; Korean Intellectual Property Office; Daejeon Metropolitan City, Republic of Korea.
Brito, Fernando; Supplemental Partial European Search Report; Jul. 10, 2015; pp. 1-7; European Patent Office; Munich, Germany.
The Supplementary Partial European Search Report issued in European Application No. 12858334.1 dated Oct. 7, 2015.
The Japanese Office Action issued in Japanese Application No. 2014-547222 dated Jul. 14, 2015.
The Japanese Office Action issued in Japanese Application No. 2014-547222 dated Mar. 15, 2016.

(56) References Cited

OTHER PUBLICATIONS

The Chinese Office Action issued in Chinese Application No. 201280061497.7 dated Dec. 22, 2015.
English abstract of JP2004210043, Jul. 29, 2004, Bridgestone Corp.
English abstract of JP2005104194, Apr. 21, 2005, Yokohama Rubber Co Ltd.
English abstract of JP2006035933, Feb. 9, 2006, Bridgestone Corp.
English abstract of JP2006056502, Mar. 2, 2006, Yokohama Rubber Co Ltd.
English abstract of JP2006069440, Mar. 16, 2006, Bridgestone Corp.
English abstract of JPH04372406, Dec. 25, 1992, Bridgestone Corp.
English abstract of JPH09277805, Oct. 28, 1997, Toyo Tire & Rubber Co.
English abstract of JPH10315715, Dec. 2, 1998, Yokohama Rubber Co Ltd.
English abstract of JPH1148721, Feb. 23, 1999, Ohtsu Tire & Rubber Co Ltd.
English abstract of JPS59199306, Nov. 12, 1984, Michelin & Cie.

\* cited by examiner

THREE DIMENSIONAL SIPE

TECHNICAL FIELD

Certain embodiments disclosed herein relate generally to a tire. More specifically, disclosed herein are embodiments relating to a tire sipe.

BACKGROUND

Tire performance is an important concern. Among manufacturers and developers of tires and vehicles that use tires, as well as others, tire characteristics and tire tread characteristics are of substantial interest.

One area of study is concerned with how tread features, such as lugs, grooves, gaps, sipes, convolutions, ribs, and/or flutes, may affect tread characteristics and/or tire performance.

It remains desirable to provide tread features, such as sipes, that affect tire performance.

SUMMARY

Provided is a sipe extending into a tire tread, comprising an outer radial portion defined by a first waveform having a first amplitude, a first width, and a first wavelength, and an inner radial portion defined by a second waveform having a second amplitude, a second width, and a second wavelength. The first wavelength may be less than 5% of the length of the sipe or may be more than 100% of the length of the sipe, or the second wavelength may be less than 5% of the length of the sipe or may be more than 100% of the length of the sipe, or the second amplitude may be more than 50% of the first wavelength or may be less than 10% of the first wavelength, or the second amplitude may be more than 50% of the second wavelength or may be less than 10% of the second wavelength.

Further provided is a tire tread comprising at least one tread element comprising a waveform sipe therein. The waveform sipe has length, extends into the tire tread, and may comprise an outer radial portion and an inner radial portion. The outer radial portion may be defined by a first waveform having a first amplitude, a first width, and a first wavelength. The first waveform may be a sine or zig-zaged waveform. The inner radial portion may be defined by a second waveform having a second amplitude, a second width, and a second wavelength. The second waveform may be the same type of waveform as the first waveform. The first wavelength may be less than 5% of the length of the sipe or may be more than 100% of the length of the sipe, or the second wavelength may be less than 5% of the length of the sipe or may be more than 100% of the length of the sipe, or the second amplitude may be more than 50% of the first wavelength or may be less than 10% of the first wavelength, or the second amplitude may be more than 50% of the second wavelength or may be less than 10% of the second wavelength.

Provided is a waveform sipe, the waveform sipe having length and width, the waveform sipe having depth defined by its extent into a tire tread. The waveform sipe may comprise an outer radial portion and an inner radial portion. The outer radial portion may be defined by a first waveform having a first amplitude, a first width, and a first wavelength. The first waveform may be a sine or zig-zaged waveform. The first width may be between 0 mm and 5 mm, inclusive. The first wavelength may be between 2 mm and 50 mm. The inner radial portion may be defined by a second waveform having a second amplitude, a second width, and a second wavelength. The second waveform may be the same type of waveform as the first waveform. The second width may be greater than the first width. The length of the sipe may be between 2 mm and 50 mm. The width of the sipe may be described by an opening function. The first wavelength may be less than 5% of the length of the sipe or may be more than 100% of the length of the sipe, or the second wavelength may be less than 5% of the length of the sipe or may be more than 100% of the length of the sipe, or the second amplitude may be more than 50% of the first wavelength or may be less than 10% of the first wavelength, or the second amplitude may be more than 50% of the second wavelength or may be less than 10% of the second wavelength.

DETAILED DESCRIPTION

Reference will be made to the drawings, FIGS. 1-16, wherein the showings are only for purposes of illustrating certain embodiments of a three dimensional sipe.

Figure 1:
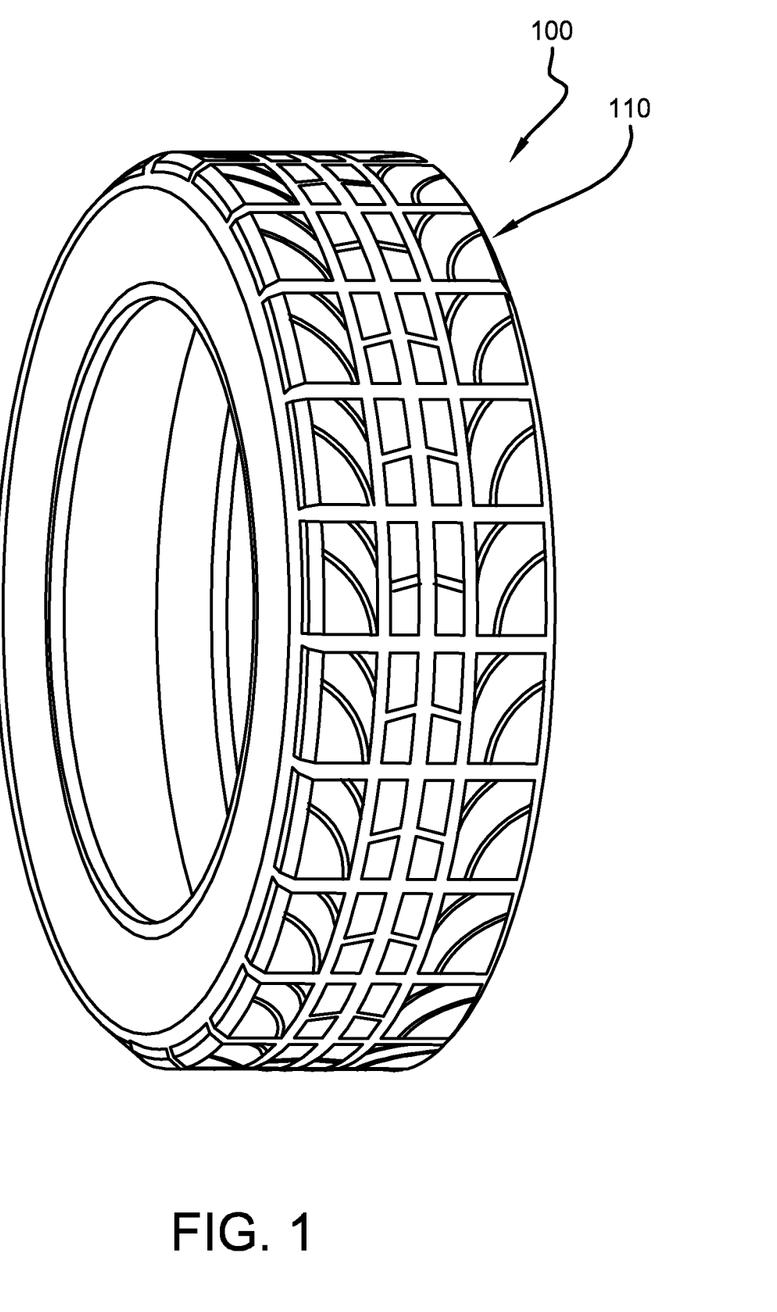
FIG. 1 shows a non-limiting embodiment of a tire.

FIG. 1 shows a non-limiting embodiment of a tire 100. As shown in FIG. 1, in some embodiment a tire comprises a tread 110. The tread 110 of a tire, or tire tread, comprises the circumferential surface of the tire 100. A tread 110 may comprise a tread pattern of grooves, sipes, ribs, blocks and other geometric elements. The grooves, sipes, ribs, blocks and other geometric elements of a tire tread 110 may promote the expulsion of water from the tire 100, affect tire noise, affect traction, or otherwise influence or affect tire performance.

Figure 2:
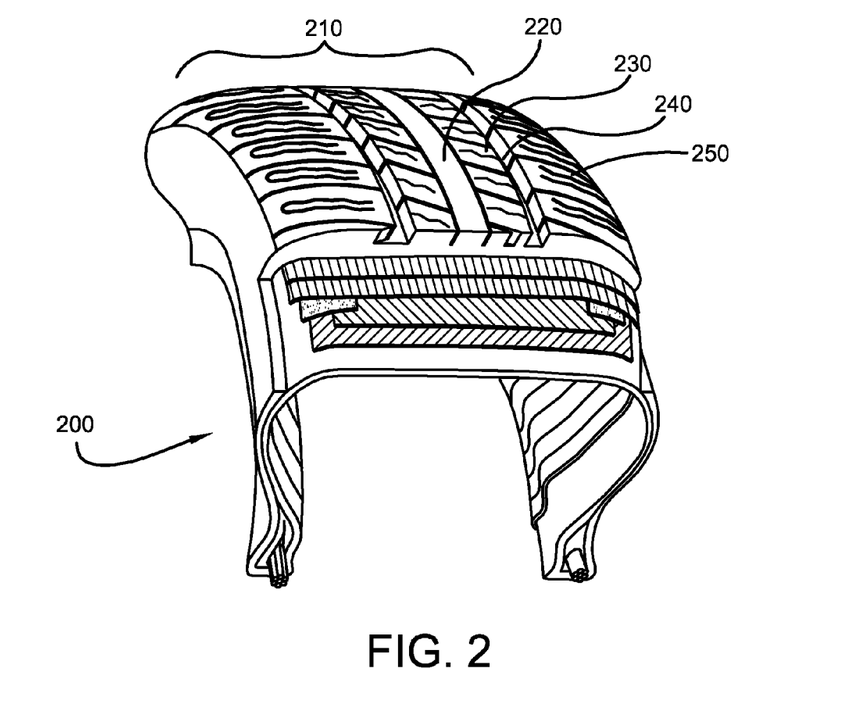
FIG. 2 shows a non-limiting embodiment of a tire section.
Figure 3:
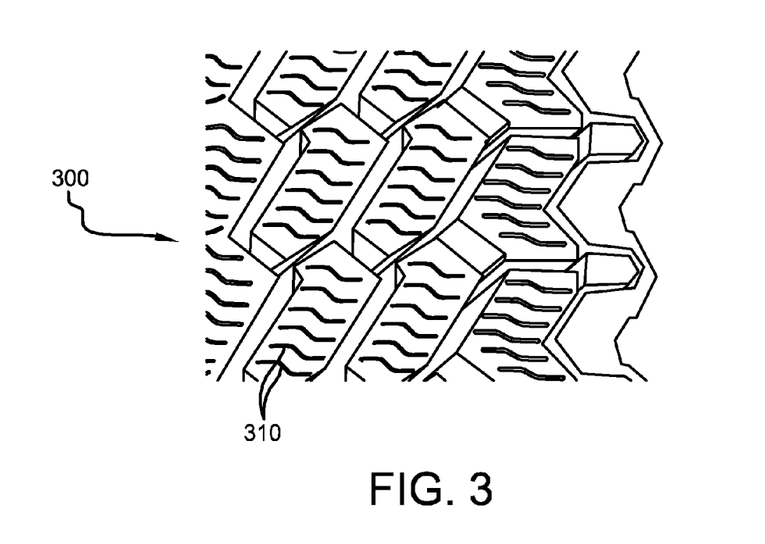
FIG. 3 shows a non-limiting embodiment of a tread with sipes therein.
Figure 4:
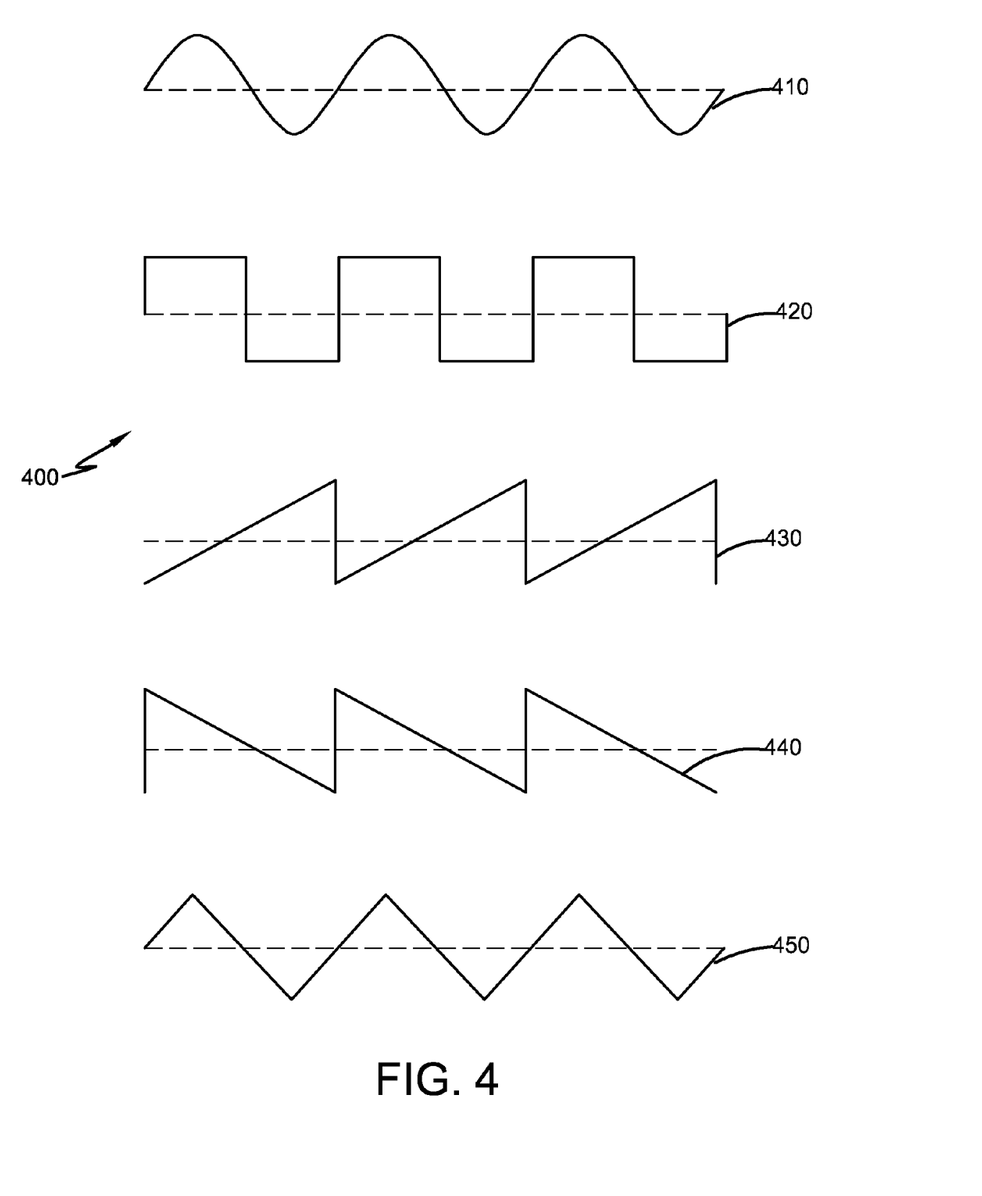
FIG. 4 shows some of the forms that a waveform sipe may take.

FIG. 2 shows a non-limiting section of a tire 200. The tread area 210 of the non-limiting section of a tire 200 shown in FIG. 2 comprises a rib 220, a tread block 230, a groove 240, and a sipe 250. FIG. 3 shows a non-limiting example of a tread with several examples of a sipe 310 therein. A sipe 250 is a very narrow gap or thin cut in the tread. The width of a sipe 250 is typically, between 0 and 5 millimeters wide, inclusive. As will be disclosed further herebelow, the width of a sipe 250 may vary with depth or along the length of the sipe 250. A sipe having a width of 0 mm still comprises the sipe edges, length, depth, and a shape. Further, a sipe having a width of 0 mm may open or permit slip or motion between the faces of the sipe during operation of the tire in which they are made. A sipe 250 may have substantial depth, and may also be substantially elongated. The path of elongation described by a sipe 250 may take any of a large number of forms. A sipe 250 may comprise a straight shape, a curved shape, an arcuate shape, a waveform, or combinations thereof. FIG. 4 shows some of the forms that a waveform sipe may take: sine or sinusoidal 410, square 420, ramp 430, saw tooth 440, or triangular 450. As used herein, unless otherwise noted, the term "zig-zaged" will comprise the forms ramp 430, saw tooth 440, and triangular 450 as shown in FIG. 4. Without limitation, FIG. 3 shows several examples of a zig-zaged sipe 310. While the type of waveform may be important for performance and engineering reasons, including, but not limited to stress-concentration factors, the disclosures herein relate to all kinds of waveforms unless otherwise noted.

Figure 5:
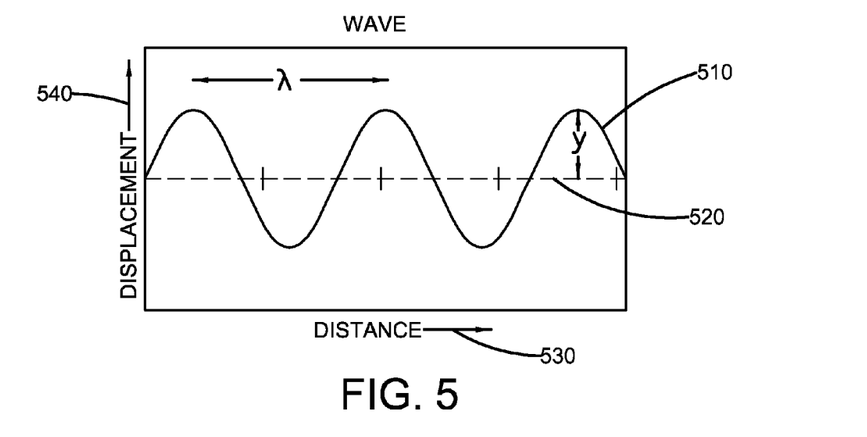
FIG. 5 shows a sinusoidal wave.

With reference to FIG. 5, and without limitation, a sinusoidal waveform 510 may be defined by an equation having the form:

$$y(x) = A \cdot \sin(\omega x + \phi)$$

Where:
y(x) is displacement in a direction perpendicular to the x direction, the x-direction being the horizontal direction, (distance) in FIG. 5;
A is the amplitude, the peak deviation of the function from its center position;
ω is the angular frequency of the oscillations; and
φ is the phase that specifies where in its cycle the oscillation begins.

The amplitude, A, the angular frequency, ω, and the phase, φ, each may be any real number. Square waveforms 420 and zig-zaged waveforms 430, 440, 450 and other waveforms may be defined or substantially approximated using a Fourier series. Accordingly, waveform sipes may be described in terms of their type of wave, their amplitude or "pitch width", and their wavelength (λ) or "pitch length".

Figure 6:
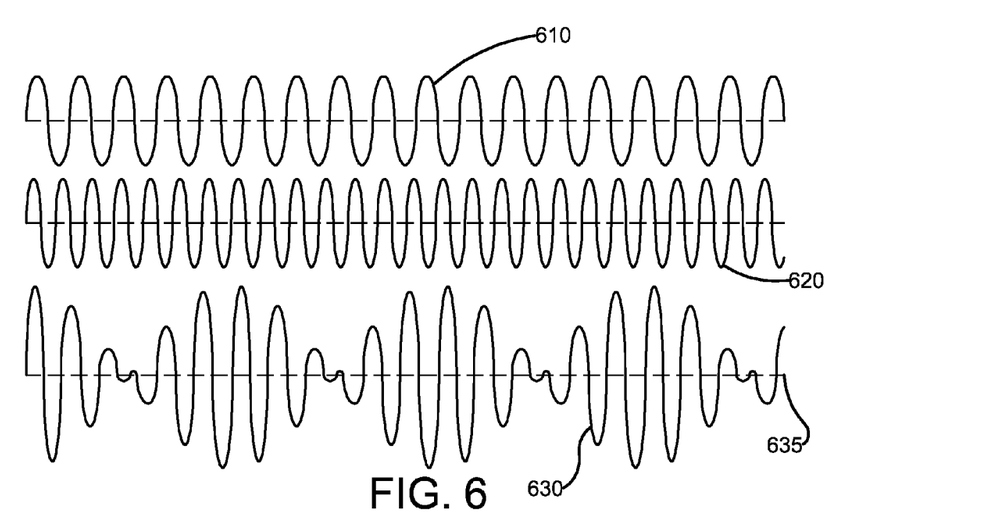
FIG. 6 shows a set of sinusoidal waves.

With reference to FIGS. 4, 5, and 6, a waveform may be described in terms of the type of wave, the wavelength, and the amplitude. In the alternative, waveform may be described in terms of the type of wave, the frequency, and the amplitude. Shown in FIG. 6 are three sinusoidal waves. The top wave 610 has constant amplitude and a constant frequency. The middle wave 620 has a constant amplitude and a constant frequency slightly different from that of the top wave. The bottom wave 630 is the sum of the top and middle waves. The bottom wave 630 shows a beat; the amplitude of the wave 630 is variable along the path 635 of the wave. In general, waveforms can be formed by summing two of more other waveforms. As noted above, each of the square waveform 420 and the zig-zaged waveforms 430, 440, 450 shown in FIG. 4 can be formed or substantially approximated by a sum of sinusoidal waves. As noted above, some non-sinusoidal waveforms can be described in terms of a sum of sinusoidal waveforms or Fourier series.

Figure 7:
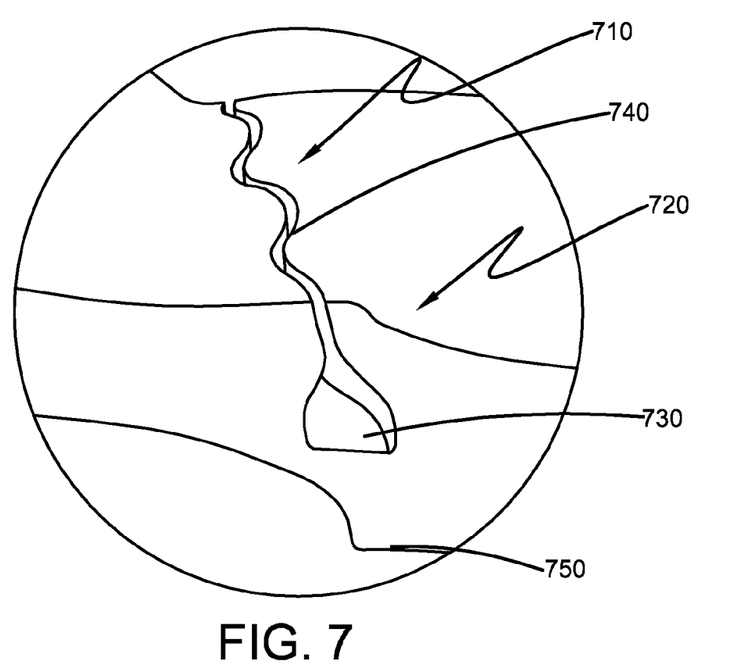
FIG. 7 shows a detailed view of one embodiment of a sipe.

With reference to non-limiting FIG. 7, and as noted above, a sipe 710 has depth. The depth of a sipe, whether parallel to the radial direction of the tire or not, may be described as a radial dimension, such that the sipe 710 has an outer radial portion 720 and an inner radial portion 730. The top of the sipe 740 is the radially outer most portion of the sipe and the bottom of the sipe 750 is the radially inner most portion of the sipe 710. The width or other characteristics of the sipe 710 may change with depth. In the non-limiting embodiment shown in FIG. 7, the width of the sipe is very narrow in the outer radial portion 720, the width increases dramatically with depth, and the inner radial portion 730 is very wide for a sipe. The sipe 710 shown in FIG. 7 may be referred to as a "keyhole sipe". With continued reference to FIG. 7, in the embodiments shown, the outer radial portion 720 of the sipe is defined by a sinusoidal wave. The form of the inner radial portion 730 may be similar to the sinusoidal form of the outer radial portion 720 or it may differ therefrom; that is, the inner radial portion 730 may be straight, a similar waveform, a different waveform, or another geometry.

In embodiments in which the width of the sipe 710 changes with depth, the width of the sipe 710 may be a function of depth. A width that is a function of depth may be defined by an equation and may be linear, non-linear, continuous, or non-continuous. For example, and without limitation, in certain embodiments the width, w, of a sipe may be a linear function of depth, d, such that w(d)=A(d)+B; where A and B are constants. For example, and without limitation, in certain embodiments the width, w, of a sipe may be a quadratic function of depth, d, such that w(d)=A(d)^2+B(d)+C; where A, B, and C are constants. In certain embodiments the width of the sipe may be a non-continuous function of depth. For example, and without limitation, in certain embodiments the width, w, of a sipe may be a non-continuous function of depth, d, such that for 0=<d=<15 mm, w(d)=B; for 15<d, w(d)=A(d)+B; where A and B are constants. The latter non-continuous function describes a sipe having a constant width, B, for the outer 15 mm of depth and having a width that increases linearly over the portion of the depth deeper than 15 mm. A function that describes the width sipe that increases in width as depth increases will be referred to herein as an opening function.

Referring again to FIG. 6, a waveform may be constant in type, frequency or wavelength, and/or amplitude over its length, as shown in the top wave 610 and middle wave 620 of FIG. 6, or a waveform may vary in type, frequency or wavelength, and/or amplitude over its length, as shown in the bottom wave 630 of FIG. 6. Frequency, wavelength, and amplitude can all be variables that vary as a function of position. One way in which, frequency, wavelength, and amplitude can vary as a function of position is with position along the path of the waveform. As shown in FIG. 5, and without limitation, the path 520 of the waveform is parallel to the horizontal axis 530, distance, in the waveform shown in FIG. 5. Another way in which, frequency, wavelength, and amplitude can vary as a function of position is with depth. As shown in FIG. 5 and in FIGS. 7-9, and without limitation, the depth of the waveform corresponds to the dimension transverse to both the horizontal axis 530 and the vertical axis 540 of the waveform shown in FIG. 5; that is, depth is the dimension into or out of the page in FIG. 5. While the sipe itself may be angled or oblique with respect to the depth dimension, the sipe may still be referred to as having some depth.

Figure 8:
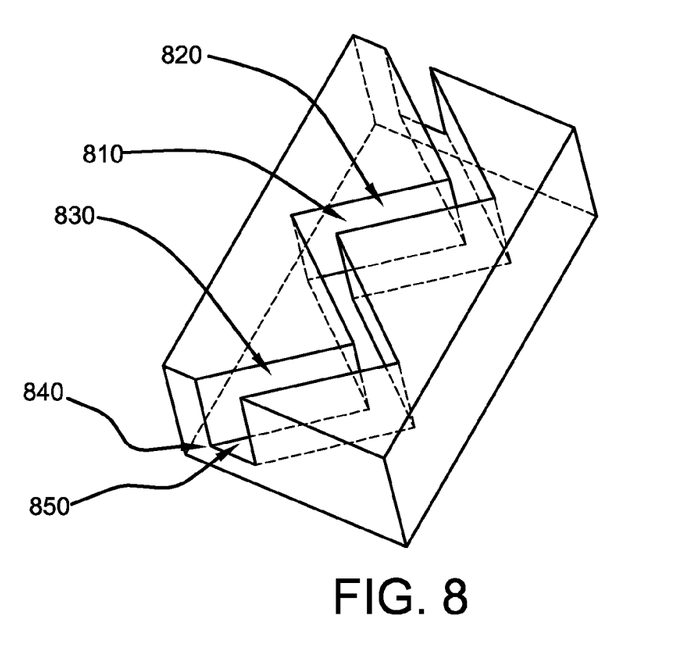
FIG. 8 shows a close-up of a portion of a non-limiting tread.
Figure 9:
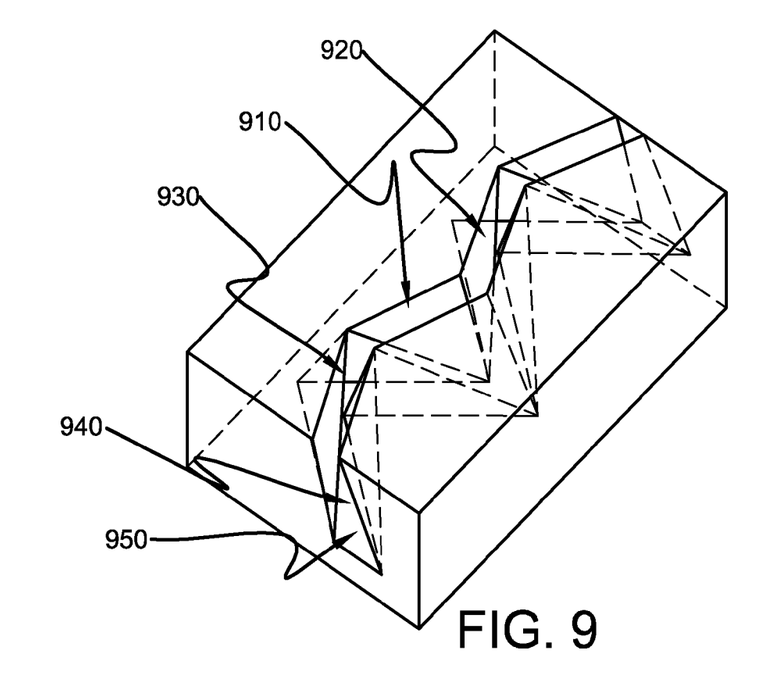
FIG. 9 shows a close-up of a portion of a non-limiting tread.
Figure 10:
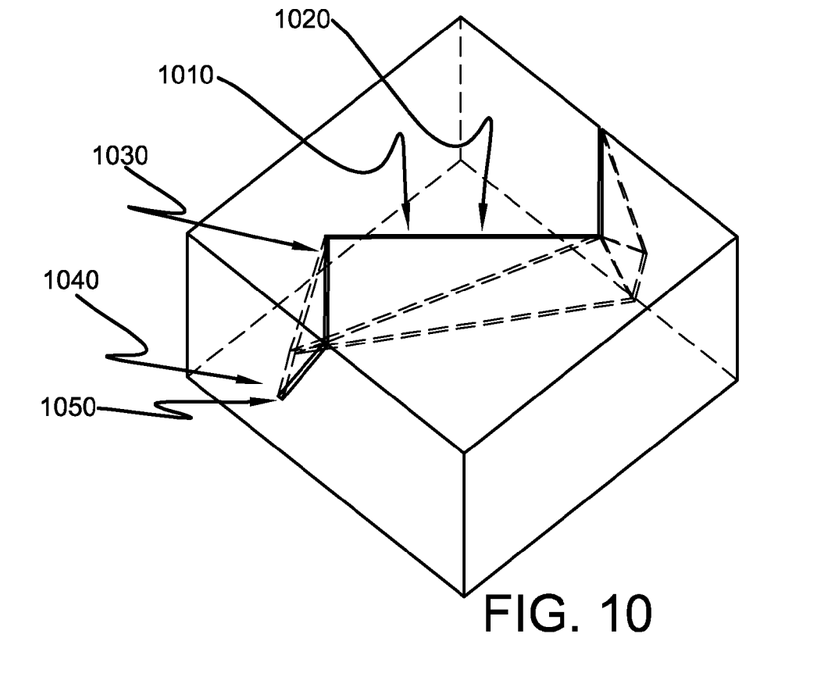
FIG. 10 shows a close-up of a portion of a non-limiting tread.

The non-limiting embodiments in FIGS. 8, 9, and 10 show close-up sections of a tread. In some figures, the width of the sipe in the figure may be exaggerated for the purposes of improving visibility.

The non-limiting embodiments in FIGS. 8, 9, and 10 each show a sipe 810, 910, 1010 in which, in the region or area shown, the outer radial portion of the sipe 820, 920, 1020 is defined by a first waveform 830, 930, 1030 having a first wavelength, and the inner radial portion of the sipe 840, 940, 1040 is defined by a second waveform 850, 950, 1050 having a second wavelength. The region or area may be a particular geometric section of a tread, such as a block, or a rib, another finite region or area, or at least in the case of a waveform having variable properties, an infinitesimal region or area. The second waveform 850, 950, 1050 may be the same waveform as the first waveform 830, 930, 1030, as shown in FIGS. 8, 9, and 10, or it may be a different waveform. The second wavelength may be less than, equal to, or greater than, the first wavelength. The second amplitude may be less than, equal to, or greater than, the first amplitude.

In the non-limiting embodiment in FIG. 8 both the outer radial portion 820 and the inner radial portion 840 comprise a zig-zaged waveform 830, 850, the amplitude of the inner radial portion 840 waveform is substantially equal to the amplitude of the outer radial portion 820 waveform, and the wavelength of the inner radial portion 840 waveform is substantially equal to the wavelength of the outer radial portion 820 waveform.

The non-limiting embodiment in FIG. 9 shows a sipe having the same inner radial portion 940 waveform as that shown in FIG. 8, but the outer radial portion 920 waveform shown in FIG. 9 has a much smaller amplitude than does the outer radial portion 820 waveform of FIG. 8. The non-limiting embodiment in FIG. 9 shows both the outer radial portion 920 and the inner radial portion 940 comprise a waveform, the amplitude of inner radial portion 940 waveform is substantially greater than the amplitude of the outer radial portion 920 waveform, and the wavelength of the inner radial portion 940 waveform is substantially equal to the wavelength of the outer radial portion 920. In certain embodiments, both the outer radial portion and the inner radial portion comprise a waveform, and the amplitude of the inner radial portion waveform is more than 10% greater than the amplitude of the outer radial portion waveform, or is more than 20% greater than the amplitude of the outer radial portion waveform, or is even greater.

The non-limiting embodiment in FIG. 10 shows a sipe in which both the outer radial portion and the inner radial portion comprise a waveform, the wavelength of the inner radial portion 1040 waveform is slightly more than 50% greater than the wavelength of the outer radial portion 1020 waveform, and the amplitude of the inner radial portion 1040 waveform is substantially equal to the amplitude of the outer radial portion 1020. In certain embodiments, both the outer radial portion and the inner radial portion comprise a waveform, and the wavelength of the inner radial portion is more than 10% greater than the wavelength of the outer radial portion wavelength, is more than 50% greater than the outer radial portion amplitude, or even greater.

In all real world applications, the sipe will have a finite length, referred to herein as the sipe length. The ratio of the wavelength of waveform sipes to the sipe length may be relevant to performance. The ratio of the wavelength of a waveform sipe to the sipe length may range from nearly zero, for very short wavelengths in very long sipes, to nearly infinite for very long wavelengths in very short sipes.

Figure 11:
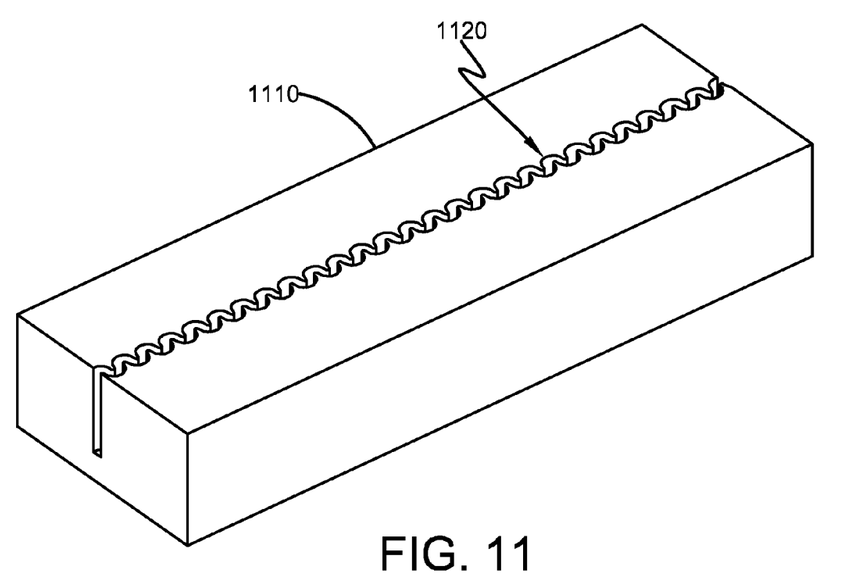
FIG. 11 shows a close-up of a portion of a non-limiting tread.

In the non-limiting embodiment shown in FIG. 11, a close up of a tread element 1110 is shown comprising a waveform sipe 1120. The waveform sipe 1120 runs the full length of the tread element 1110 and consists of 26 wavelengths. Accordingly, the ratio of the wavelength of the waveform sipe 1120 in FIG. 11 to the sipe length of the waveform sipe 1120 is 1/26 or about 3.8%.

Figure 12:
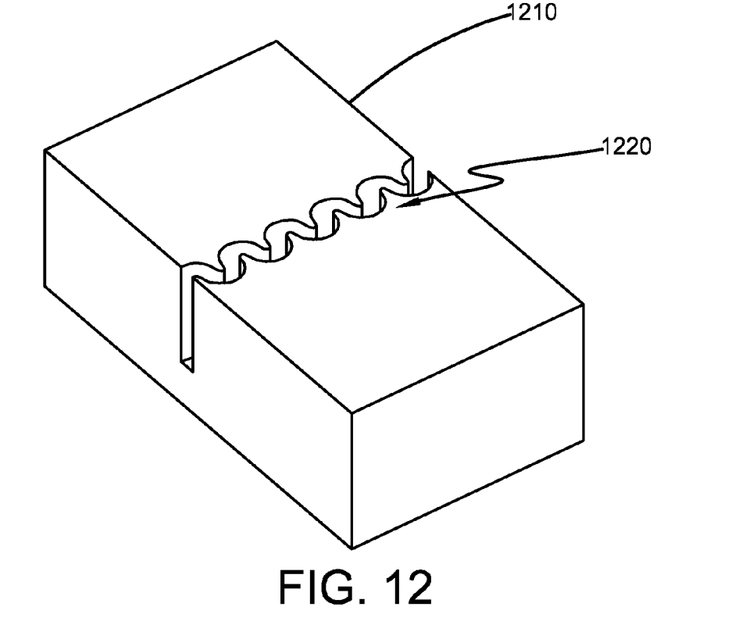
FIG. 12 shows a close-up of a portion of a non-limiting tread.

In the non-limiting embodiment shown in FIG. 12, a close-up of a tread element 1210 is shown comprising a waveform sipe 1220. The waveform sipe 1220 runs the full length of the tread element 1210 and consists of 5 wavelengths. Accordingly, the ratio of the wavelength of the waveform sipe 1220 in FIG. 12 to the sipe length of the waveform sipe 1220 is 1/5 or about 20%.

Figure 13:
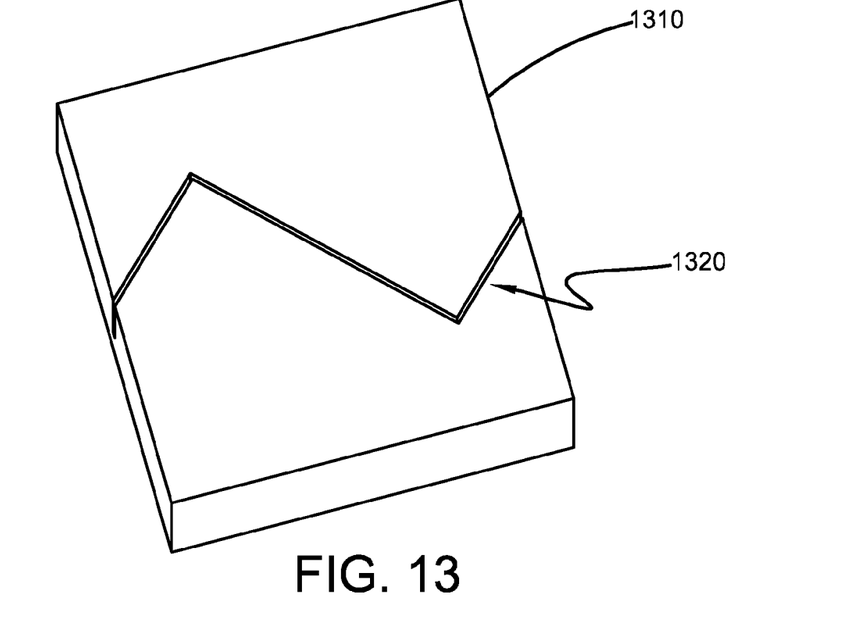
FIG. 13 shows a close-up of a portion of a non-limiting tread.

In the non-limiting embodiment shown in FIG. 13, a close-up of a tread element 1310 is shown comprising a waveform sipe 1320. The waveform sipe 1320 runs the full length of the tread element 1310 and consists of slightly less than 1 wavelength. Accordingly, the ratio of the wavelength of the waveform sipe 1320 in FIG. 13 to the sipe length of the waveform sipe 1320 is greater than 100%.

The ratio of the amplitude of a waveform sipe to the wavelength of the waveform sipe may be relevant to performance. The ratio of the amplitude of waveform sipes to the wavelength may range from nearly zero, for very low amplitudes in waveforms with very long wavelength, to nearly infinite for very high amplitudes in waveforms with very short wavelength.

Figure 14:
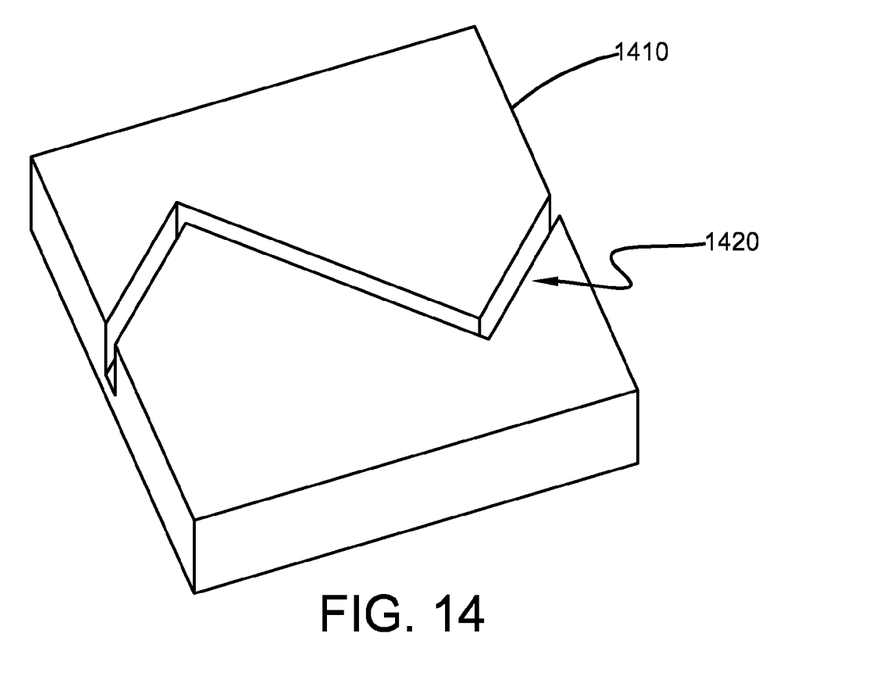
FIG. 14 shows a close-up of a portion of a non-limiting tread.

In the non-limiting embodiment shown in FIG. 14, a close-up of a tread element 1410 is shown comprising a waveform sipe 1420. The waveform sipe 1420 runs the full length of the tread element 1410 and consists of 1 wavelength where the amplitude of the waveform sipe 1420 is approximately ¼ the wavelength of waveform sipe 1420. Accordingly, the ratio of the amplitude of the waveform sipe 1420 to the wavelength of waveform sipe 1420 is about 25%.

Figure 15:
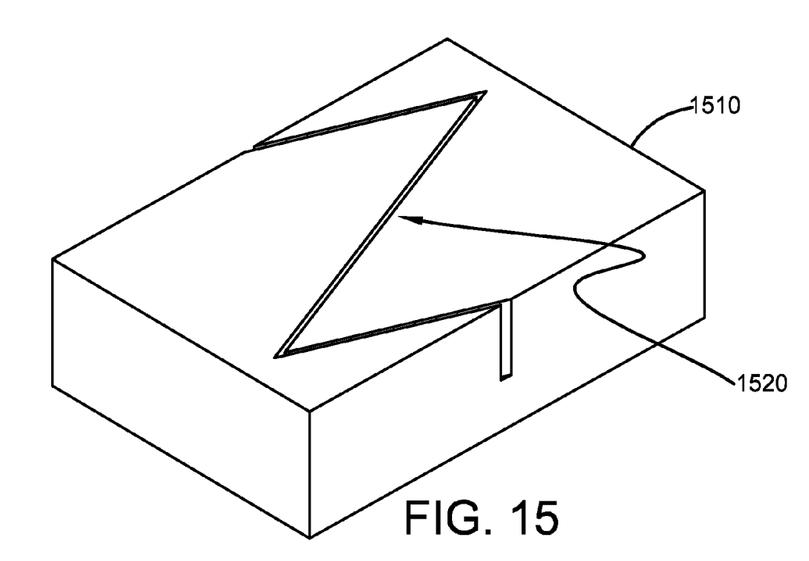
FIG. 15 shows a close-up of a portion of a non-limiting tread.

In the non-limiting embodiment shown in FIG. 15, a close-up of tread element 1510 is shown comprising a waveform sipe 1520. The waveform sipe 1520 runs the full length of the tread element 1510 and consists of 1 wavelength where the amplitude of the waveform sipe 1520 is approximately ⅜ the wavelength of waveform sipe 1520. Accordingly, the ratio of the amplitude of the sipe in FIG. 15 to its wavelength is about 62.5%.

Figure 16:
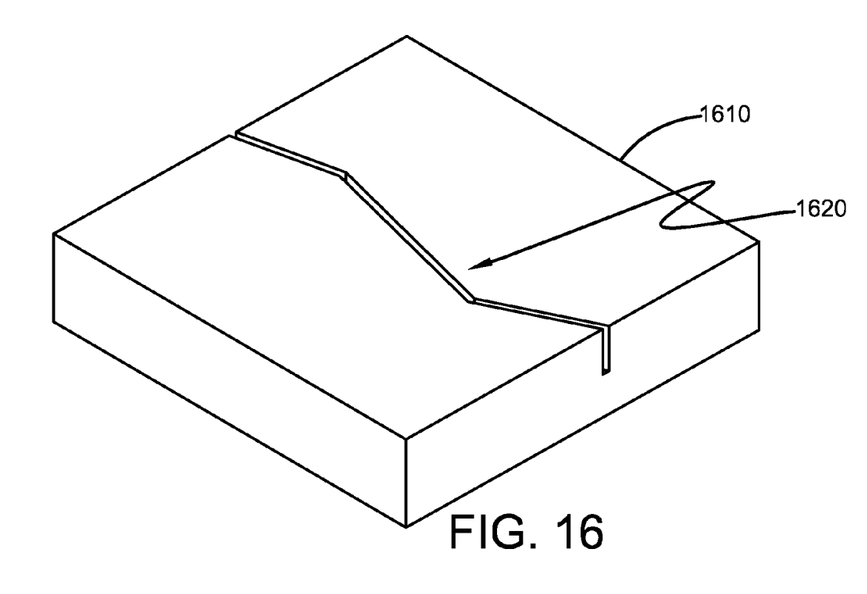
FIG. 16 shows a close-up of a portion of a non-limiting tread.

In the non-limiting embodiment shown in FIG. 16, a close-up of a tread element 1610 is shown comprising a waveform sipe 1620. The waveform sipe 1620 runs the full length of the tread element 1610 and consists of 1 wavelength where the amplitude of the waveform sipe 1620 is approximately 1/16 the wavelength of waveform sipe 1620. Accordingly, the ratio of the amplitude of the sipe in FIG. 16 to its wavelength is about 6.25%.

While the three dimensional sipe has been described above in connection with the certain embodiments, it is to be understood that other embodiments may be used or modifications and additions may be made to the described embodiments for performing the same function of the three dimensional sipe without deviating therefrom. Further, the three dimensional sipe may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the three dimensional sipe. Therefore, the three dimensional sipe should not be limited to any single embodiment, but rather construed in breadth and scope in accordance with the recitation of the attached claims.

What is claimed is:

1. A tire tread comprising at least one tread element comprising a waveform sipe therein, said waveform sipe having a length, a width and a depth defined by its extent into the tire tread, said waveform sipe comprising:
  an outer radial portion defined by a first waveform having a first amplitude, a first width, and a first wavelength; and,
  an inner radial portion defined by a second waveform having a second amplitude, a second width, and a second wavelength;
wherein said second waveform is the same type of waveform as the first waveform;
wherein the second wavelength is different from the first wavelength;
wherein said first waveform is a sine waveform;
wherein the second amplitude is different from the first amplitude; and,
wherein the width of the sipe increases as the depth increases as a continuous linear function;
wherein said first wavelength is less than 5% of the length of the sipe;
wherein said second wavelength is less than 5% of the length of the sipe; and
wherein
  the second amplitude is less than 10% of the first wavelength,
  the second amplitude is less than 10% of the second wavelength,
  the first width is between 0 mm and 5 mm, inclusive and
  the length of the sipe is between 2 mm and 50 mm, inclusive.

* * * * *